(12) United States Patent
Tsukamoto

(10) Patent No.: US 8,350,413 B1
(45) Date of Patent: Jan. 8, 2013

(54) POWER PACK

(75) Inventor: Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 608 days.

(21) Appl. No.: 11/985,391

(22) Filed: Nov. 15, 2007

Related U.S. Application Data

(60) Provisional application No. 60/859,145, filed on Nov. 15, 2006.

(51) Int. Cl.
*H02J 1/00* (2006.01)
*H02J 3/00* (2006.01)

(52) U.S. Cl. ............ 307/71; 429/50; 429/61; 429/90; 320/116; 320/138

(58) Field of Classification Search ............ 307/71; 320/116–123
See application file for complete search history.

(56) References Cited

U.S. PATENT DOCUMENTS

| | | | | |
|---|---|---|---|---|
| 3,487,299 A | * | 12/1969 | Rosacker et al. | 324/253 |
| 4,255,782 A | * | 3/1981 | Joyce | 363/8 |
| 5,898,291 A | * | 4/1999 | Hall | 320/121 |
| 5,969,503 A | * | 10/1999 | Davis et al. | 320/120 |
| 5,998,969 A | * | 12/1999 | Tsuji et al. | 320/132 |
| 6,465,986 B1 | * | 10/2002 | Haba | 320/116 |
| 6,538,414 B1 | * | 3/2003 | Tsuruga et al. | 320/119 |
| 6,624,612 B1 | * | 9/2003 | Lundquist | 320/118 |
| 7,288,919 B2 | * | 10/2007 | Morita | 320/116 |
| 7,573,234 B1 | * | 8/2009 | Tsukamoto et al. | 320/116 |
| 2003/0042870 A1 | * | 3/2003 | Yau et al. | 320/117 |
| 2003/0152830 A1 | * | 8/2003 | Eaves | 429/156 |
| 2005/0017682 A1 | * | 1/2005 | Canter et al. | 320/118 |
| 2005/0024015 A1 | * | 2/2005 | Houldsworth et al. | 320/119 |
| 2005/0042505 A1 | * | 2/2005 | Cooper et al. | 429/160 |
| 2005/0140335 A1 | * | 6/2005 | Lee et al. | 320/118 |
| 2005/0275372 A1 | * | 12/2005 | Crowell | 320/112 |
| 2006/0214636 A1 | * | 9/2006 | Arai et al. | 320/116 |
| 2007/0126399 A1 | * | 6/2007 | Benckenstein et al. | 320/119 |
| 2008/0088277 A1 | * | 4/2008 | Wang et al. | 320/119 |

OTHER PUBLICATIONS

JP 2004129439 to Nishida et al. english abstract, Apr. 22, 2004.*
JP Pub 2004273796 to Yamamoto et al., english abstract, Sep. 30, 2004.*

* cited by examiner

*Primary Examiner* — Rexford Barnie
*Assistant Examiner* — Justen Fauth
(74) *Attorney, Agent, or Firm* — Gavrilovich, Dodd & Lindsey, LLP

(57) ABSTRACT

The power pack includes a plurality of parallel groups. Each parallel group includes a plurality of electrical power sources connected in parallel. The pack also includes a plurality of series groups. Each series group connects in series one of the power sources from each of the parallel groups. The pack also includes a series balancing circuit configured to balance the voltage of the power sources in one of the series groups such that one or more power sources in the series group recharges one or more other power sources in the same series group.

16 Claims, 3 Drawing Sheets

POWER PACK

RELATED APPLICATIONS

This Application is a continuation of U.S. Patent Application Ser. No. 60/859,145, filed on Nov. 15, 2006, entitled "Power Pack," and incorporated herein in its entirety.

FIELD

The present invention relates to power sources and more particularly to interconnection of multiple power sources.

BACKGROUND

Battery systems that employ a plurality of interconnected batteries have been designed to address the need for battery systems that can power the movement of vehicles such as cars. Many of these systems connect batteries in series. However, different batteries in a series will have different capacities, different self-discharge rates and/or different impedances that will affect the performance of these systems. Drawing a high current from these systems can cause the voltage of one or more batteries to fall to a dangerously low level and fail while the remaining batteries remain operational. The failure of the battery can cause failure of the entire system. There is a need for an improved battery system that addresses the variations in the performance of different batteries.

SUMMARY

A power pack includes a plurality of parallel groups. Each parallel group includes a plurality of electrical power sources connected in parallel. The pack also includes a plurality of series groups. Each series group includes power sources from different parallel groups connected in series. The pack also includes a series balancing circuit configured to balance the voltage of the power sources in one of the series groups such that one or more power sources in the series group recharges one or more other power sources in the same series group. In some instances, the series balancing circuit is one of a plurality of series balancing circuits and each series balancing circuit is configured to balance the voltage of the power sources in one of the series groups.

One embodiment of the power pack includes electronics configured to operate the series balancing circuit such that the one or more power sources in the series group recharges the one or more other power sources in the series group. The electronics are also configured to electrically disconnect one or more of the power sources in the series group from the series balancing circuit while the electronics are operating the series balancing circuit. The disconnection of the one or more of the power sources in the series group disables the disconnected power sources from recharging the other power sources in the series group while the electronics operate the series balancing circuit, and/or disables the other power sources in the series group from recharging the disconnected power sources while the electronics are operate the series balancing circuit.

DESCRIPTION

A power pack includes a plurality of parallel groups. Each parallel group includes a plurality of power sources connected in parallel. The power sources can be rechargeable electrical power sources such as rechargeable batteries. Because the rechargeable electrical power sources are connected in parallel, one or more power sources in a parallel group will recharge other power sources in the same parallel group until each power source in the parallel group has the same voltage. The power pack can also include a plurality of series groups. Each series group includes power sources from different parallel groups connected in series. The pack also includes a series balancing circuit configured to balance the voltage of the power sources in one of the series groups such that one or more power sources in the series group recharges one or more other power sources in the same series group. As a result, the power sources in the series group move toward the same voltage. Accordingly, the power pack can balance the voltage of the power sources in both the parallel groups and in the series groups. The ability to balance these power sources can permit the power pack to overcome issues associated with variance in the performance of different power sources.

Figure 1A:
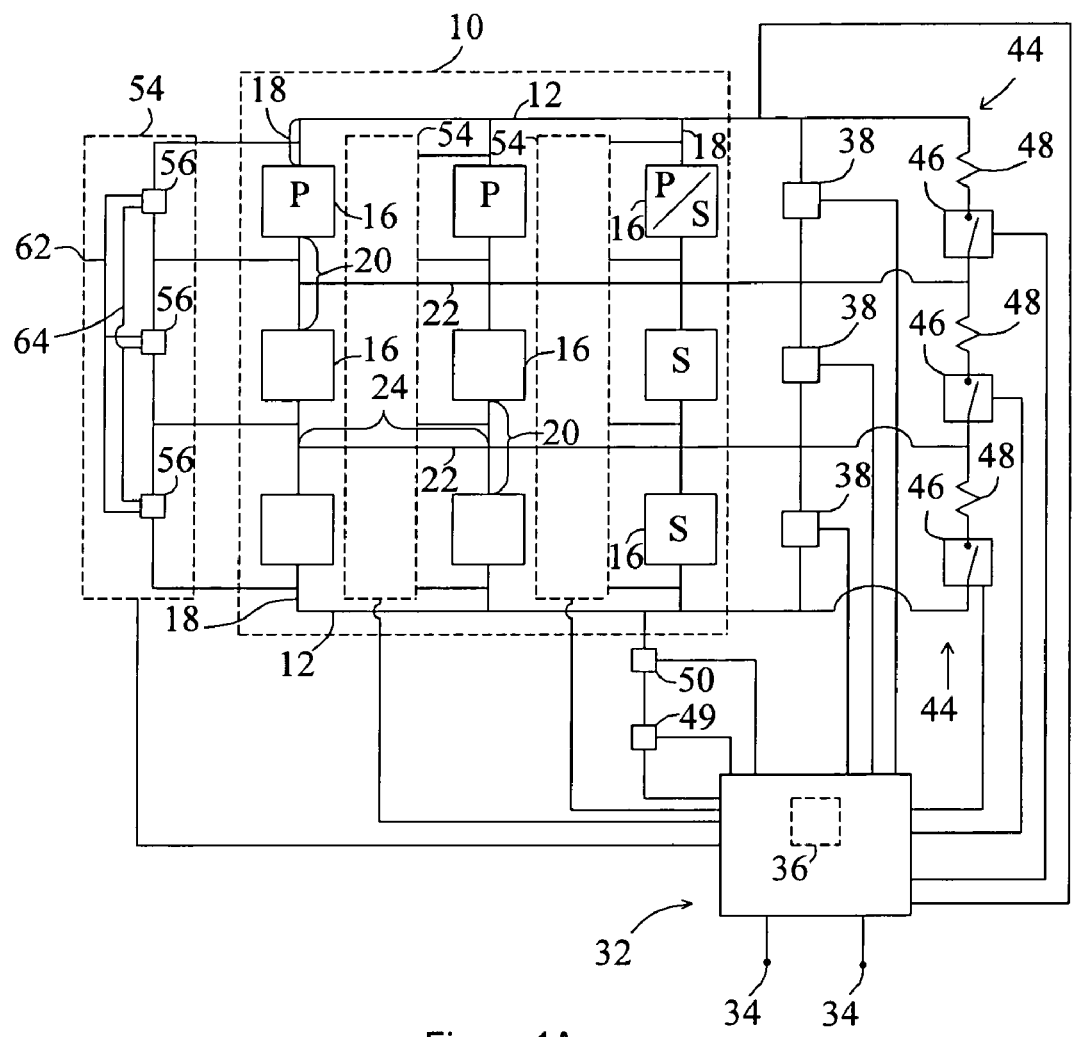
FIG. 1A is a schematic diagram of a power pack.

FIG. 1A is a schematic diagram of a power pack that interconnects a plurality of power sources. Suitable power sources for use in the power pack include electrical power sources. As will be described in more detail below, the power sources can each include or consist of a battery or a plurality of interconnected batteries.

The power pack includes a power assembly 10. The power assembly 10 includes two primary parallel lines 12 that connect three series groups in parallel. Each of the series groups includes a plurality of batteries connected in series. For instance, each of the power sources labeled S in FIG. 1A belongs to the same series group. Each series group in FIG. 1A includes three power sources 16 connected in series. Primary series lines 18 each provide electrical communication between a series group and a primary parallel line 12 and secondary series lines 20 provide electrical communication between the power sources 16 connected in series.

The power assembly 10 also includes a plurality of secondary parallel lines 22. The secondary parallel lines 22 each include one or more cross lines 24 that provide electrical communication between the secondary series lines 20 in different series groups. Accordingly, each secondary parallel line 22 provides a parallel connection between the power sources 16 in different series group. For instance, each secondary parallel line 22 provides electrical communication between different series groups such that a power source 16 in one of the series groups is connected in parallel with a power source 16 in the other series groups. Because a single secondary parallel line 22 only provides one of the parallel connections, another connection is needed to connect power sources 16 in parallel. The other parallel connection can be provided by another secondary parallel line 22 or by a primary parallel line 12. Each of the power sources 16 connected in parallel belongs to a parallel group. For instance, each of the power sources labeled P in FIG. 1A belongs to the same parallel group. Accordingly, the power assembly 10 of FIG. 1A includes three parallel groups.

The power assembly 10 of FIG. 1A can be scaled to include more power sources or fewer power sources. For instance, the power assembly 10 can include four or more power sources, twelve or more power sources, twenty-five or more power sources, eighty-one or more power sources, one hundred or more power sources. The number of power sources in each parallel group can be the same or different from the number of power sources in each series group. The number of power sources in each series group can be increased in order to increase the voltage of the system or decreased in order to decrease the voltage of the system. Each series group can include two or more power sources; four or more power sources; more than eight power sources; or fifteen or more power sources. The number of series groups can be increased for applications that require higher power levels or decreased for applications that require lower power levels. In one embodiment, the power pack includes only one parallel group and no series groups. The power pack can include two or more series groups; four or more series groups; ten or more series groups; or fifteen or more series groups.

The connections between the power sources can be standard methods for connecting power sources. The connections between the power sources and the conductors can be made using connection methods that are suitable for the amount of current and power that will be delivered by the power source. For instance, conductors can be connected to a power source by welding. Additionally or alternately, one or more of the primary parallel lines and the connected primary series lines can optionally be integrated into a single line. For instance, a single wire, cable, piece of sheet metal, or metal bar can serve as both a primary parallel line and as the connected primary series lines. Additionally or alternately, one or more the secondary parallel lines and the connected secondary series lines can optionally be integrated into a single line. For instance, a single wire, cable, piece of sheet metal, or metal bar can serve as both a secondary parallel line and as the connected secondary series lines.

The power pack of FIG. 1A includes electronics 32 in electrical communication with the power assembly 10 and with terminals 34 that serve as the terminals 34 for the power pack. Accordingly, the output for the power assembly 10 can be received at the terminals 34. The power assembly 10 can be recharged by applying a potential across the terminals 34.

The electronics 32 can include a processor 36 that executes many functions of the electronics 32 and/or the power pack. Suitable processors 36 include, but are not limited to, firmware, hardware and software or a combination thereof. Examples of suitable processors 36 include, but are not limited to, analog electrical circuits, digital electrical circuits, processors 36, microprocessors 36, digital signal processors 36 (DSPs), computers, microcomputers, ASICs, and discrete electrical components, or combinations suitable for performing the required control functions. In some instances, the electronics 32 include one or more memories (not shown) and one or more processing units such as a CPU. The one or more memories can include instructions to be executed by the processor 36 during performance of the control and monitoring functions.

The electronics 32 are in electrical communication with one or more first voltage sensors 38. The electronics 32 can employ each first voltage sensors 38 to monitor the potential of a parallel group. Suitable first voltage sensors 38 include, but are not limited to, voltmeters.

A shunt circuit 44 is connected in parallel with each parallel group. A shunt circuit 44 can include one or more switches 46 and one or more resistors 48. For instance, the battery pack of FIG. 1A includes a plurality of shunt circuits 44 that are each configured to provide a current pathway around a parallel group and to effectively by-pass the parallel group. Each shunt circuit 44 includes a switch 46 connected in series with one or more resistors 48. The switches 46 can be operated by the electronics 32. Each switch 46 is arranged such that one of the parallel groups is shorted when the switch 46 is closed and but the shunt circuit 44 is an open circuit when the switch 46 is open. Accordingly, the parallel group is not shunted when switch 46 is open. When a switch 46 is closed, the associated resistor 48 is selected to prevent the functioning batteries in the bypassed parallel group from being short-circuited.

During operation of the power pack, a differential may develop between the voltage of different parallel groups. In some instances, the voltage of one or more parallel groups may rise to levels that are undesirably high or fall to levels that are undesirably low. For instance, the voltage of one or more parallel groups may rise above an upper threshold while charging the power pack or fall below a lower threshold while discharging the power pack. The upper threshold can be the maximum operational voltage of a power source, the maximum voltage to which a power pack should be charged, a threshold above which damage to the power sources in a parallel group may occur or above which the power source becomes unsafe for normal operation. The lower threshold can be the minimum operational voltage of a power source or a threshold below which damage to the power sources in a parallel group may occur or below which the power source becomes unsafe for normal operation. In these instances, the electronics 32 can employ a switch 46 in a shunt circuit 44 to provide a bypass around the parallel group that is above the upper threshold or below the lower threshold. As a result, that parallel group is effectively removed from the power assembly 10 permitting continued charging and/or discharging of the power pack.

The shunt circuits 44 can also be employed in response to other fault condition in the power pack. For instance, experiments have shown that a parallel group that includes a power source that has or develops an unusually high self-discharge will contribute to the functioning of the power pack for several cycles but subsequent cycling can cause the voltage of the parallel group to drop to an undesirably low level that can adversely affect the performance of the power pack. Accordingly, the electronics 32 can employ a shunt circuit 44 to bypass a parallel group once the voltage of the parallel group falls below a threshold. When the electronics 32 employ a shunt circuit 44 in response to the voltage of a parallel group falling below a threshold, the shunt circuit 44 is preferably employed when the voltage of the parallel group is at or below the threshold to reduce issues associated with shorting of more highly charged power sources as a result of employing the shunt circuit 44. The threshold can be higher than the minimum operational voltage of the power sources in the power pack. Additionally, the threshold can be higher than the voltage to which the power pack is or can be discharged before recharging or is higher than the low voltage of the voltages between which the power pack is being cycled.

The electronics include one or more power assembly switches configured to electrically disconnect the power assembly from the terminal. For instance, FIG. 1A illustrates the power pack including a first switch 49 and a second switch 50 in electrical communication with the processor 36. The first switch 49 and the second switch 50 are each configured to electrically disconnect the power assembly 10 from the terminals 34 and accordingly stopping the current flow through the power assembly 10. For instance, the electronics 32 can open the first switch 49 and/or the second switch 50 to disconnect the power assembly 10 from the terminals 34 and accordingly to disrupt the current flow from the terminals 34. The electronics 32 can close the first switch 49 and/or the second switch 50 so as to connect the power assembly 10 to the terminals 34 and accordingly permit current flow through the terminals 34. A suitable first switch 49 includes, but is not limited to, a transistor such as a Field Effect Transistor (FET). A suitable second switch 50 includes, but is not limited to, a transistor such as a Field Effect Transistor (FET). The electronics 32 can employ the first switch 49 and/or the second switch 50 to disconnect the power assembly 10 from the electrical contacts in the event that the current through the power assembly 10 exceeds an upper system current threshold, and/or in the event that the voltage of the power assembly 10 exceeds an upper system voltage threshold, and/or in the event that the voltage of the power assembly 10 falls below a lower system voltage threshold. In some instances, the electronics 32 employ the first switch 49 and/or the second switch 50 to disconnect the power assembly 10 from the electrical contacts in the event that the voltage of one or more parallel groups rises above an upper threshold while charging the power pack or fall below a lower threshold while discharging the power pack.

FIG. 1A illustrates the electronics 32 including two power assembly switches because some switches such as Field Effect Transistors are sensitive to the current direction. Accordingly, one of the switches can be employed to disconnect the terminals 34 from the power assembly 10 when the power pack is charging and the other switch can be employed to disconnect the terminals 34 from the power assembly 10 when the power pack is discharging. For instance, the first switch 49 can be employed to disconnect the terminals 34 from the power assembly 10 when the power pack is charging and the second switch 50 can be employed to disconnect the terminals 34 from the power assembly 10 when the power pack is discharging. As a result, the switch that is employed by the electronics 32 to disconnect the terminals 34 from the power assembly 10 can depend on whether the power assembly 10 is being charged or discharged.

When the first switch 49 and the second switch 50 are not sensitive to current direction, a single switch can replace the first switch 49 and the second switch 50.

Although the first switch 49 and the second switch 50 are shown as positioned electrically between the power assembly 10 and the electronics 32, the first switch 49 and/or the second switch 50 can be electrically positioned between the electronics 32 and a terminal or the terminals. When a single switch provides the functions of the first switch 49 and the second switch 50, the switch can be electrically positioned between the electronics 32 and a terminal or the terminals.

As noted from the above discussion, the electronics 32 can include shunt circuits 44 that the electronics 32 use to bypass a parallel group when the voltage of the parallel group exceeds an upper threshold while charging the power pack and the electronics 32 include a first switch 49 that disconnects the power assembly 10 from the terminals 34 when the voltage of a parallel group exceeds an upper threshold. Accordingly, in instances where the functions performed by the shunt circuits 44 and the first switch 49 are redundant, the shunt circuits 44 or the first switch 49 can be optional. Alternately, the first switch 49 can serve as a back-up for the shunt circuit 44. For instance, the upper threshold at which the first switch 49 is opened can be higher than the upper threshold at which the switch 46 for a shunt circuit 44 is closed.

The series groups are each in electrical communication with a series balancing circuit 54. In order to simplify FIG. 1A, each of the series balancing circuits 54 is illustrated by dashed lines and some of the details are illustrated for only one of the series balancing circuits 54. Each series balancing circuits 54 includes a plurality of power management circuits 56. Each of the power management circuits 56 in a series balancing circuit 54 is connected in parallel with a power source 16 in one of the series groups. Additionally, the power management circuits 56 in a series balancing circuits are connected in series. The electronics 32 are in electrical communication with each of the series balancing circuits 54.

The series balancing circuit 54 is configured to balance the voltage of each of the power sources 16 in the series group such that the power sources 16 in the series group with higher voltages recharge the power sources 16 in the same series group with lower voltages. As a result, operation of a series balancing circuit permits the power sources 16 in a series group to move toward the same voltage. When power sources 16 are connected parallel, the power sources will recharge one another such that the power sources approach the same. However, connecting the power sources 16 of a series group in parallel short-circuits the power sources 16 in the series group. As a result, the series balancing circuit 54 effectively connects the power sources 16 in a series group in parallel without short-circuiting the power sources 16 in that series group.

Figure 1B:
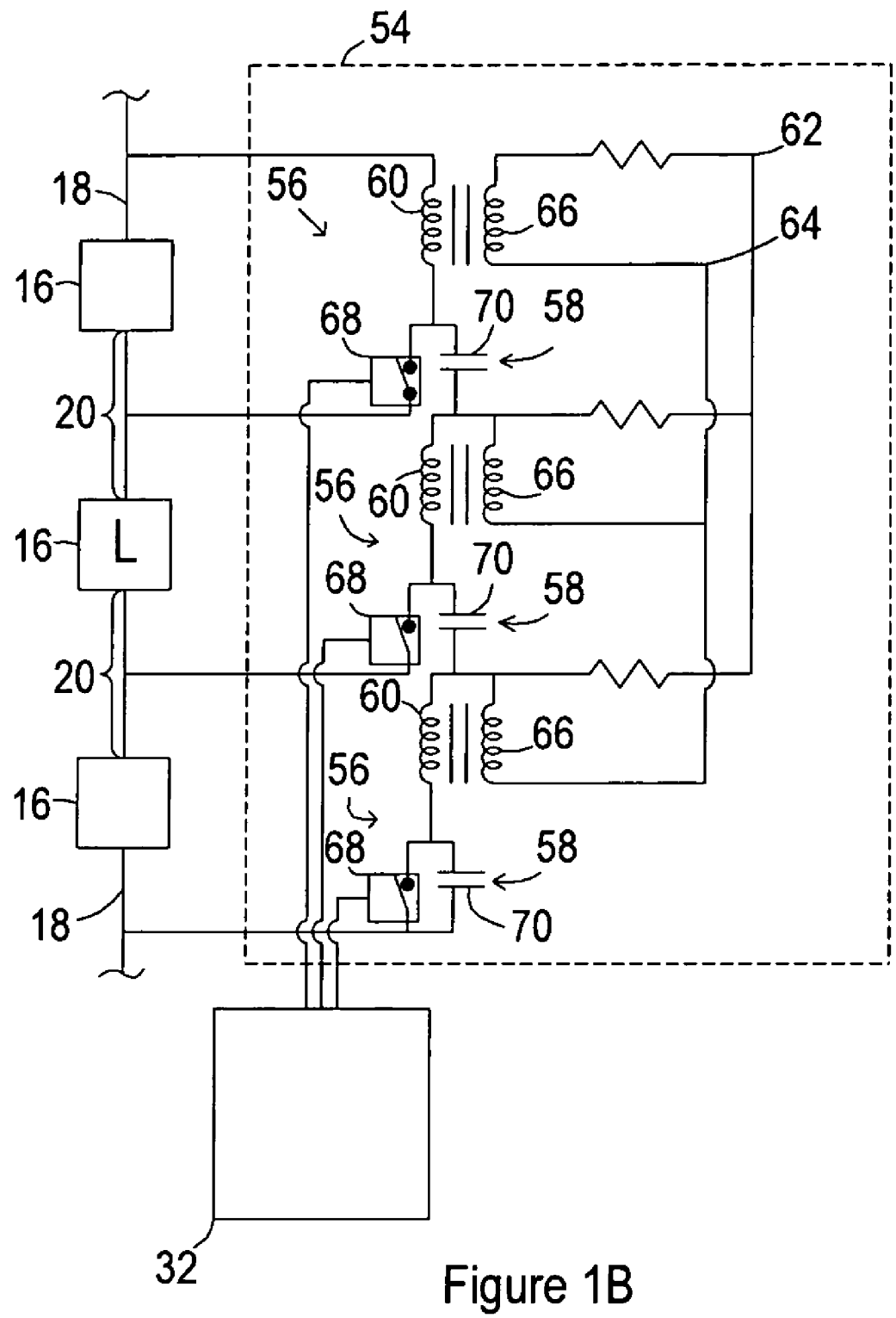
FIG. 1B is a schematic diagram of a series balancing circuit employed in the power pack.

FIG. 1B is a schematic of a series balancing circuit 54 that is suitable for use with the power pack of FIG. 1A. The series balancing circuit 54 is shown with the associated series group from the power assembly of FIG. 1A. Each power management circuit 56 includes a current varying device 58 connected in series with the primary winding 60 of a transformer. A positive common line 62 and a negative common line 64 connect the secondary windings 66 of the transformers in a series balancing circuit in parallel.

The electronics 32 are in communication with each of the current varying devices 58. The electronics 32 operate each current varying device 58 so as to vary the current through the power management circuit 56 from the associated power source 16. The current varying device 58 illustrated in FIG. 1B includes a switch 68 connected in parallel with a capacitor 70. The electronics 32 can open and close the switch 68 so as to generate an alternating current or a pulsating DC current in each of the power management circuits 56. Suitable switches include, but are not limited to, field effect transistor (FET).

Each power management circuit 56 can include the same components. For instance, the current varying device 58 and the transformer in each of the power management circuits 56 can be have substantially the same electrical performance. In particular, the switch 68, the capacitor 70, and the transformer in each of the power management circuits 56 can be substantially the same structure and provide the same electrical performance. For instance, each of the transformers in a series balancing circuit can have the same voltage ratio, the switches can each be FETs, and the capacitors can each provide the same capacitance. The transformers can be one-to-one transformers, step-up transformers, or step-down transformers.

During operation of the series balancing circuit 54, the electronics operate the current varying device 58 so as to vary the current through each of the first windings. For instance, the electronics can concurrently open and close the switch 68 in each of the power management circuits 56 illustrated in FIG. 1B. The magnetic field that results in each of the primary windings 60 induces a voltage in the associated secondary winding 66. Since the secondary windings 66 are connected in parallel, the voltage across each of the secondary windings 66 is driven to the same level. Since batteries in a series group will have different capacities, different self-discharge rates and/or different impedances, the voltage of different batteries in the series group can vary. When one or more of the power sources 16 has a voltage that is less than the other power sources 16, the voltage drop across the primary winding 60 associated with the low voltage power sources will be lower than the voltage drop across the other primary windings 60. As a result, the secondary winding 66 associated with the low voltage power source will effectively induce a current in the primary winding 60 associated with the low voltage power source. The induced current recharges the low voltage power source. As a result, the power sources 16 in the series groups are effectively charged to about the same voltage level.

The electronics can continually operate the power management circuits 56 so as to provide series balancing of the series groups. Alternately, the electronics can periodically operate the power management circuits 56 so as to provide series balancing of the series groups. For instance, the electronics can operate the power management circuits 56 so as to provide series balancing after discharge, after charge or during storage.

As noted above, the voltage of one or more parallel groups may rise above an upper threshold or fall below a lower threshold. When the voltage of a parallel group rises above an upper threshold or falls below a lower threshold, the electronics 32 can disconnect the power source in that parallel group from the series balancing circuit 54. For instance, if the parallel group that includes the power source 16 labeled L in FIG. 1B develops a short and the voltage of the parallel group drops below a lower threshold, the electronics 32 can leave the switch 68 associated with the power source 16 labeled L open while the electronics operate the series balancing circuit 54 in FIG. 1B. As an example, the electronics 32 can leave the switch 68 associated with the power source 16 labeled L open while the electronics open and close the switches 68 in the other power management circuits 56. Accordingly, the electronics 32 can disconnect a power source 16 from a series balancing circuit 54 by refraining from operating the current varying device 58 associated with that power. Additionally, the electronics 32 can disconnect a power source 16 from a series balancing circuit 54 by disconnecting the power management circuit associated with that power source from the series balancing circuit 54.

Disconnecting a power source from the series balancing circuit 54 disables other power sources in the series group from recharging the disconnected power source. Additionally or alternatively, disconnecting a power source from the series balancing circuit 54 disables that power source from recharging other power sources in the series group.

As noted above, the electronics may employ a shunt circuit to bypass a parallel group in response to the voltage of the parallel group rising above an upper threshold or falling below a lower threshold. The electronics can use a shunt circuit to bypass a parallel group in combination with disconnecting of the power sources 16 that belong in that parallel group from the series balancing circuits 54 to permit the power pack to continue operating despite a fault condition or failure of one or more power sources 16 in the power pack.

Although FIG. 1A illustrates the secondary parallel lines 22 providing electrical communication between the series groups such that a power source 16 in one of the series groups is connected in parallel with a power source 16 in each of the other series groups, the secondary parallel lines 22 can provide electrical communication between the series groups such that a power source 16 in one of the series groups is connected in parallel with a power source 16 in a portion of the other series groups.

The power assemblies 10 of FIG. 1A and FIG. 1B can include other electrical connections between the primary parallel lines 12. For instance, other power sources 16 and/or series groups can be connected between the primary parallel lines 12 but not otherwise electrically connected to the illustrated series groups. Further, the power assembly 10 can include other components between the primary parallel lines 12.

The power pack can be configured to provide more than 9 V or more than 12 V. Additionally or alternately, the power packs can be configured to provide more than 50 watt-hours, more than 100 watt-hours or more than 240 watt-hours. Many of the advantages associated with the power pack do not become evident until the power pack is used for applications requiring high power levels. As a result, the power pack is suitable for high power applications such as powering the movement of vehicles such as trucks, cars and carts. For these high power applications, the power pack is preferably configured to provide more than 18 V, more than 24 V or more than 32 V. Additionally or alternately, the power pack is preferably configured to provide more than 240 watt-hours, more than 500 watt-hours or more than 1000 watt-hours. In some instances, the above performance levels are achieved using a power pack where the power sources 16 in the series groups each have a voltage of less than 14 V, 10 V or 5 V.

In some instances, one or more of the power sources 16 are configured to provide more than 9 V or more than 12 V. Additionally or alternately, the power sources 16 can be configured to provide more than 50 watt-hours, more than 100 watt-hours or more than 240 watt-hours. When the power pack is used for applications requiring high power levels such as powering the movement of vehicles such as trucks, cars and carts, the power sources 16 are preferably configured to provide more than 18 V, more than 24 V or more than 32 V. Additionally or alternately, the power sources 16 are preferably configured to provide more than 240 watt-hours, more than 500 watt-hours or more than 1000 watt-hours.

The power sources 16 can be sources of electrical power and in particular, sources of DC electrical power. Each power source can include or consist of a battery or cell. In some instances, the power sources include a plurality of batteries or cells. For instance, each power source can be a battery pack. A suitable battery pack can have a plurality of batteries arranged in a plurality of pack parallel group that are connected in series. Each pack parallel group can include a plurality of the batteries connected in parallel. In some instances, the battery pack also includes these same batteries connected in pack series group. Each pack series group includes a plurality of the batteries connected in series. For instance, each battery pack can be arranged according to the power assembly illustrated in FIG. 1A with each power source illustrated in FIG. 1A consisting of a single battery.

A suitable battery pack for use as a power source is disclosed in U.S. Provisional Patent Application Ser. No. 60/740,150, filed on Nov. 28, 2005, entitled "Battery System Configured To Survive Failure of One or More Batteries," and incorporated herein in its entirety. U.S. Provisional Patent Application Ser. No. 60/740,150 discloses a method for charging and discharging a battery pack having a power assembly constructed according to FIG. 1A such that the battery pack can survive failure of one or more batteries without a substantial drop in the capacity in the battery pack. The electronics 32 can be configured to charge and discharge the battery pack in accordance with U.S. Provisional Patent Application Ser. No. 60/740,150. Another suitable battery pack for use as a power source is disclosed in U.S. Provisional Patent Application Ser. No. 60/753,862, filed on Dec. 22, 2005, and entitled "Battery Pack System," and incorporated herein in its entirety. U.S. Provisional Patent Application Ser. No. 60/753,862 discloses intermittently dropping the battery pack current from a first level to a second level while charging and/or discharging the battery pack. The electronics 32 can be configured to intermittently drop the battery pack current from the first level to the second level in accordance with U.S. Provisional Patent Application Ser. No. 60/753,862.

Additional details about the construction, operation, and/or electronics for a battery pack and battery pack systems can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. Provisional Patent Application Ser. No. 60/740,150; filed on Nov. 28, 2005; and entitled "Battery System Configured to Survive Failure of One or More Batteries;" and in U.S. Provisional Patent Application Ser. No. 60/740,202; filed on Nov. 28, 2005; and entitled "Battery Pack System;" and in U.S. patent application Ser. No. 11/269,285; filed on Nov. 8, 2005; and entitled "Modular Battery Pack;" and in U.S. Provisional U.S. Patent Application Ser. No. 60/740,204, filed on Nov. 28, 2005, entitled "Battery Pack System;" and in U.S. Provisional U.S. Patent Application Ser. No. 60/753,862, filed on Dec. 22, 2005, entitled "Battery Pack System;" each of which is incorporated herein in its entirety. When possible, the functions of the electronics described in the above applications can be performed by the electronics of this application in addition to the functions described in this application. When possible, the functions of the electronics and/or controllers described in the above applications can optionally be performed in addition to the functions described in this application.

Figure 2:
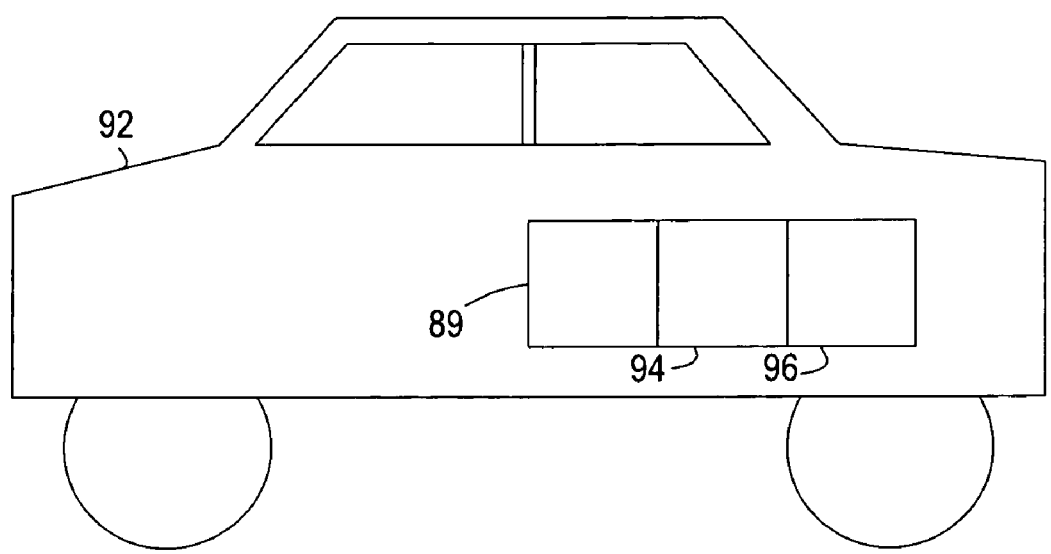
FIG. 2 illustrates a power pack employed in a vehicle for transporting people.

The power pack can be employed to power movement of a vehicle. Examples of suitable vehicles are vehicles configured to hold and transport living people such as cars, truck and golf-carts. In some instances, the vehicles are for transporting people on land. FIG. 2 illustrates a power pack 89 employed in a vehicle 92. The power pack 89 provides an electrical signal to a drive source 94 which is connected to a power train 96. The power train is configured to transmit power from the power pack 89 to a drive mechanism (not shown) such as a drive axle. The drive source can include a motor and/or engine. The power pack 89 can assist the motor and/or engine in generating movement of the vehicle 92. Alternately, the power pack 89 can be the only source of power provided to the drive source. Although the power pack 89 is disclosed in the context of powering vehicles, the power pack 89 can be employed in other applications.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A power pack, comprising:
a series group connecting in series multiple electrical power sources
a series balancing circuit configured to balance the voltage of the power sources in the series group such that one or more power sources in the series group recharges one or more other power sources in the same series group, and
electronics configured to electrically disconnect one or more of the power sources in the balanced series group such that when the series balancing circuit is balancing the voltages the one or more disconnected power sources is disabled from recharging the other power sources in the balanced series group and the other power sources in the balanced series group are disabled from recharging the one or more disconnected power sources.

2. The pack of claim 1, wherein the series balancing circuit includes a plurality of power management circuits that are each connected in parallel with a different power source in the series group.

3. The pack of claim 2, wherein the series balancing circuit includes a plurality of transformers that each has a first winding associated with a second winding, and
each of the power management circuits includes one of the first windings.

4. The pack of claim 3, wherein the second windings are connected in parallel.

5. The pack of claim 4, wherein electronics are configured to vary a current through each of the first windings so as to induce a voltage in each of the second windings.

6. The pack of claim 3, wherein each power management circuit includes a current varying device connected in series with the first winding in the power management circuit, the current varying device being configured to vary the current in the first winding that is connected in series with the current varying device.

7. The pack of claim 6, further comprising:
electronics configured to operate the current varying devices so as to vary a current through one or more of the first windings such that a voltage is induced the second windings associated with the one or more first windings.

8. The pack of claim 2, wherein the electronics electrically disconnect the one or more power sources in response to a voltage of a parallel group exceeding a threshold.

9. The pack of claim 2, wherein the electronics electrically disconnect the one or more power sources in response to a voltage of a parallel group falling below a threshold.

10. The pack of claim 1, wherein the power sources in the series group are included in a larger number of power sources included in the power pack, the power sources arranged into parallel groups,
each parallel group including a plurality of the power sources connected in parallel, and
the series group including one of the power sources from each parallel group.

11. The pack of claim 10, wherein the series group is one of several series groups included in the pack,
each series group including a plurality of the power sources connected in series such that each series group includes one power source from each one of the parallel groups.

12. The pack of claim 2, wherein the series balancing circuit is one of a plurality of series balancing circuits included in the power pack, each series balancing circuit configured to balance the voltage of the power sources in the series groups such that one or more power sources in the series group recharges one or more other power sources in the series group.

13. A power pack, comprising:
a plurality of parallel groups, each parallel group including a plurality of electrical power sources connected in parallel;
a plurality of series groups, each series group including a plurality of the electrical power sources connected in series;
a series balancing circuit configured to balance the voltage of the power sources in one of the series groups such that one or more power sources in the series group recharges one or more other power sources in the series group,
the series balancing circuit includes a plurality of transformers that each has a first winding associated with a second winding, the second windings are connected in parallel, the series balancing circuit includes a plurality of power management circuits that are each connected in parallel with a different power source in the series groups, each of the power management circuits includes one of the first windings; and electronics configured to operate the series balancing circuit such that the one or more power sources in the series group recharges the one or more other power sources in the series group, the electronics being configured to electrically disconnect one or more of the power sources in the series group from the series balancing circuit while the electronics are operating the series balancing circuit such that the series balancing circuit balances the voltage of the power sources, the disconnection of the one or more of the power sources in the series group disabling the disconnected power sources from recharging the other power sources in the series group while the electronics operate the series balancing circuit such that the series balancing circuit balances the voltage of the power sources, and the disconnection of the one or more of the power sources in the series group also disabling the other power sources in the series group from recharging the disconnected power sources while the electronics are operate the series balancing circuit such that the series balancing circuit balances the voltage of the power sources.

14. The pack of claim 13, wherein the series balancing circuit is one of a plurality of series balancing circuits, each series balancing circuit being configured to balance the voltage of the power sources in a different one of the series groups.

15. The pack of claim 13, wherein the electronics electrically disconnect the one or more power sources in response to a voltage of a parallel group exceeding a threshold.

16. The pack of claim 13, wherein the electronics electrically disconnect the one or more power sources in response to a voltage of a parallel group falling below a threshold.

* * * * *